United States Patent [19]

Herrick

[11] Patent Number: 5,395,131
[45] Date of Patent: Mar. 7, 1995

[54] ANTI-THEFT HITCH BALL

[76] Inventor: Douglas J. Herrick, N2919 Smokey Hollow Rd., Poynette, Wis. 53955

[21] Appl. No.: 232,498
[22] Filed: Apr. 22, 1994
[51] Int. Cl.⁶ .............................................. B60D 1/06
[52] U.S. Cl. ..................................... 280/507; 280/511; 411/292; 411/348; 411/351; 411/948
[58] Field of Search .................. 280/507, 511, 504; 70/258, 14; 411/348, 356, 357, 358, 351, 292, 948

[56] References Cited

U.S. PATENT DOCUMENTS

| Re. 28,187 | 10/1974 | Longenecker | 280/507 |
|---|---|---|---|
| 466,389 | 1/1892 | Waterhouse. | |
| 804,803 | 11/1905 | Garrett. | |
| 815,497 | 3/1906 | Watson. | |
| 1,709,539 | 4/1929 | Poelman. | |
| 2,718,252 | 9/1955 | Schuster. | |
| 3,226,133 | 12/1965 | Geresy | 280/507 |
| 3,790,192 | 2/1974 | Green | 280/507 |
| 4,230,336 | 10/1980 | Avrea et al. | 280/507 |
| 4,542,914 | 9/1985 | Shropshire | 180/507 |
| 4,794,769 | 1/1989 | Persons | 70/232 |

Primary Examiner—Mitchell J. Hill
Attorney, Agent, or Firm—Lathrop & Clark

[57] ABSTRACT

A generally spherical hitch ball has a downwardly extending neck and an outwardly extending flange which engages against the trailer hitch of a towing vehicle. A threaded shaft extends downwardly from the flange through an opening in the hitch. The coupling device is fixed to the hitch by a nut which is threaded on the shaft and engages a washer against the hitch. The nut is retained on the threaded shaft and positively prevented from escaping by a cylindrical pin which extends through an inclined hole formed in the hitch ball and the shaft. The pin has a head which is biased upwardly by a spring against the trailer arm where it fits over the ball. When the trailer arm is locked in place the pin head is inaccessible and the nut may not be removed.

6 Claims, 4 Drawing Sheets

ANTI-THEFT HITCH BALL

FIELD OF THE INVENTION

This invention relates to trailers and hitches in general, and to devices for securing trailers to vehicles in particular.

BACKGROUND OF THE INVENTION

Automobiles and trucks are commonly fitted with towing hitches to allow them to pull trailers of assorted types. The trailers may support boats, off road vehicles, or campers, or may be for transport of industrial or home equipment. In any event, the value of the trailer and the towed goods can be considerable, presenting an attractive target for thieves. However, because of the large size of the automobile-trailer assembly, it must at times be parked outside and will occasionally be left unattended. Automobiles are provided with numerous well known impediments to theft, i.e.: door locks, ignition locks, alarms, etc. To prevent the trailer from being separated from the hitch, the coupler arm of the trailer is typically locked to the hitch ball which is supported on the vehicle towing hitch.

The hitch ball may be attached directly to an attaching member of the pulling vehicle which may be the bumper of the pulling vehicle or a special extending tongue that is affixed to the bumper or underbody of the vehicle. The hitch ball has a spherical upper section with a downwardly protruding threaded shaft which extends through the vehicle hitch. Because different trailers require hitch balls of different diameter, for example from 1-⅞ to 2-⅝, the hitch ball must be separable from the vehicle hitch. The shaft of the hitch ball is held in place by a nut threaded beneath the tongue or the bumper of the vehicle. The towed vehicle trailer arm has a cup or socket which fits over the hitch ball and allows a pivoting and rotating connection between the trailer and the vehicle. The trailer arm will typically have structure which allows it to be secured and locked to the hitch ball.

While trailer hitch socket couplers are commonly permanently attached to the trailer, hitch ball couplers are specifically designed so that a hitch ball can be quickly and easily removed and replaced by a hitch-ball of the correct size to properly fit a trailer hitch socket coupler with a different sized socket. Thieves, too, often readily exploit these hitch ball coupler design features and in a matter of minutes can remove the hitch ball still clamped and locked into place to the trailer and reposition the hitch ball shaft in a hitch on a vehicle under their control, making it possible to rapidly drive off with the trailer and its contents.

To prevent the hitch ball from being separated from the towing vehicle hitch, it has heretofore been necessary to in some way lock the hitch ball independently, for example by a padlock inserted through the shaft beneath the hitch tongue. Not only does an additional lock add to the cost of the towing assembly, it represents an inconvenience to the driver, who must carry an additional key and take the additional time required to unlock the hitch ball lock each time the hitch ball is separated from the towing vehicle hitch.

An unlocked hitch ball not only accommodates thieves, it also presents the possibility that the securing nut may work its way off the shaft, leading to accidental disconnection while travelling. Oftentimes, additional coupling devices such as chains or secondary clamping devices and locks are employed to prevent accidental disconnection.

A trailer which is parked without a hitch ball received within the trailer arm is also susceptible to being mounted on a hitch ball or other protrusion from a towing vehicle and being removed by thieves. To prevent the trailer and from being used in this manner, hitch balls without protruding shanks, such as those sold under the name TRAILER COP have been employed. Such a device fills the cavity in a trailer arm and prevents insertion of any supporting element. However, the hitch ball without a shaft must be removed and replaced with a hitch ball with a shaft when it is desired to connect the trailer to a towing vehicle.

What is needed is a hitch ball that is relatively simple, inexpensive, easy to manufacture, and which is securable to the towing vehicle and trailer without the requirement of a separate lock.

SUMMARY OF THE INVENTION

The present invention is a safety and anti-theft coupling device for connecting the trailer arm of a pulled vehicle to the trailer hitch of a pulling vehicle. The device has a hitch-ball with an upper spherical section and a threaded shaft protruding downwardly therefrom. A hole extends at an angle to the axis of the shaft and passes through both the hitch-ball and the shaft to exit through the threads of the shaft. The threaded shaft is inserted through an opening in a trailer hitch attached to the pulling vehicle. The threaded shaft is tightly secured by a nut threaded on to the threaded shaft beneath the hitch. A pin is inserted through the hitch ball hole so that the bottom end of the pin protrudes from the hole beneath the nut. With the pin protruding from the shaft beneath the nut, removal of the nut is prevented. The pin obstruction prevents unauthorized or accidental removal once the trailer arm is secured to the hitch ball. Once the trailer arm has been detached from the hitch ball the obstructing pin can be removed and the nut can be removed from the shaft. The hitch ball can then once again be easily removed and replaced.

An alternative embodiment has a hitch-ball with an inclined surface formed adjacent the pin hole to allow a tool to aid in the removal of the pin from the hole. Another embodiment has a pin wherein portions of the pin define a bent over segment which engages with a counter-sunk portion of the hitch ball hole.

It is an object of the present invention to provide an inexpensive and uncomplicated anti-theft device for hitch balls which does not require a key.

It is another object of the present invention to provide a hitch ball with a safety feature that prevents the hitch ball from becoming disconnected from the attaching member of the pulling vehicle when the trailer hitch socket coupling device is secured in place.

It is a further object of the present invention to provide a coupling device which prevents an unattached trailer from being connected to an unauthorized towing vehicle hitch.

Further objects, features, and advantages of the invention will be apparent from the following detailed description when taken in conjunction with the accompanying drawings.

DESCRIPTION OF THE PREFERRED EMBODIMENTS

Figure 1:
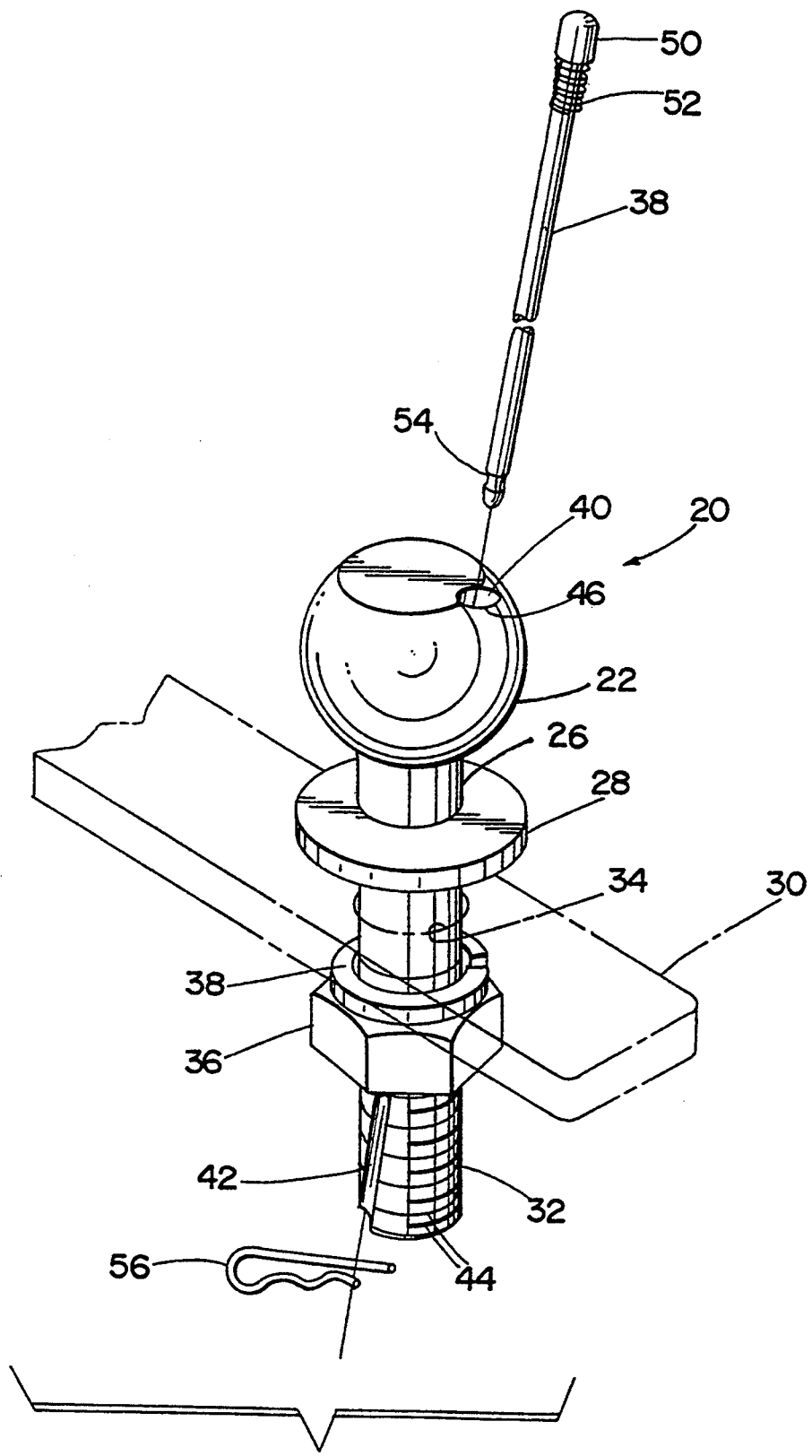
FIG. 1 is an exploded isometric view of the safety and anti-theft coupling device of this invention.

Referring more particularly to FIGS. 1–4, wherein like numbers refer to similar pans, FIG. 1 shows a safety and anti-theft coupling device 20. The device 20 has an upwardly protruding steel hitch ball 22 of generally spherical configuration and suitable for the attachment of a conventional locking trailer arm 24, shown in FIG. 2. The hitch ball may have any appropriate diameter to suit conventional trailer arm socket sizes, for example, one and seven eighths inches, two inches, or two and five eighths inches in diameter. The hitch ball 22 has a downwardly extending neck 26 and an outwardly extending flange 28 which engages against the trailer hitch 30 of a towing vehicle (not shown). A threaded shaft 32 extends downwardly from the flange 28 through an opening 34 in the hitch 30. The shaft may also be formed of a common diameter, for example three quarters inches or one inch. Although in a preferred embodiment the hitch ball 22 and threaded shaft 32 are integrally formed, such as through a casting process, the two parts may be separately formed and then connected together.

The coupling device 20 is fixed to the hitch 30 by a threaded nut 36 which is threaded on the shaft 32 and engages a washer 31 against the hitch 30.

Figure 2:
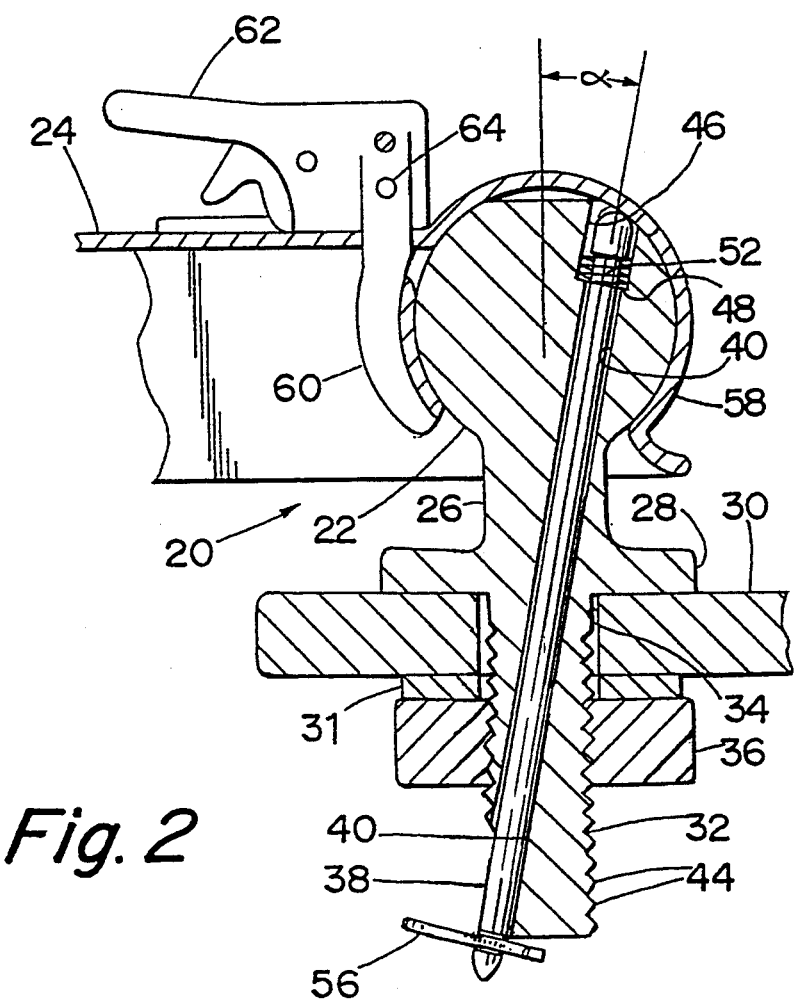
FIG. 2 is a cross-sectional view of the device of FIG. 1 connecting a towing vehicle to a towed vehicle.

The nut 36 is retained on the threaded shaft 32 and positively prevented from escaping by a slim cylindrical pin 38 which extends through the hitch ball 22 and the shaft 32. An exemplary pin is about one eighth inch in diameter. The pin 38 is preferably formed of stainless steel. As shown in FIG. 2, the pin 38 extends through an inclined cylindrical hole 40 formed in the device 20 such as by drilling. The hole 40 extends at an acute angle α which is inclined from the axis of the shaft 32 sufficiently to cause the hole to define an exit opening 42 formed by portions of the threads 44 of the shaft 32. In an exemplary threaded shaft which is three quarters of an inch in diameter, the exit opening 42 may be about one and three quarters of an inch below the flange 28. The hitch ball and shaft are preferably heat treated to strengthen the steel such that sufficient performance is obtained despite the presence of a hole extending through the article.

The hole 40 has an upwardly opening cavity 46 which is of greater diameter and which defines a ledge 48. The pin 38 has a widened head 50. A spring 52 extends between the pin head 50 and the ledge 48 formed within the opening and biases the pin upwardly.

The pin 38 has portions defining two grooves 54 which extend beneath the threaded shaft 32 when the pin 38 is fully inserted in the opening 42. The grooves receive a cotter pin 56 and hold the pin in place against the upward biasing of the spring 52. Alternatively, a hole may be formed in the pin 38 to receive a cotter pin.

As shown in FIG. 2, the locking trailer arm 24 has a semi-spherical portion 58 which overlies the hitch ball 22 and allows the trailer to rotate about multiple axes as the towing vehicle tilts and turns with respect to the towed trailer. A latch 60 extends downwardly from the trailer arm 24 and is biased against the hitch ball 22 to retain the trailer arm securely fastened to the hitch ball 22. The locking trailer arm 24 is well known in the art, and may be of the type having a release handle 62 which pivots the latch 60 and allows the trailer to be separated from the hitch ball 22. Aligned holes 64 are typically provided in the release handle 62 and the latch 60 which allow the hasp of a padlock (not shown) to be inserted to thus prevent the latch 60 from being released.

When connected, the semi-spherical portion 58 of the arm 24 engages with the spherical portions of the hitch ball 22. The head 50 of the pin is fully received within the cavity 46 and does not interfere with the motion between the hitch ball 22 and the arm 24. However, the pin 38, by extending through the threads 44 beneath the nut 36, provides a secure impediment to removal of the nut 36, and hence fixes the hitch ball to the trailer hitch 30 so long as the latch 60 is locked. The head 50 of the pin does not protrude above the hitch ball 22 and thus does not interfere with the connection of the arm 24 to the hitch ball 22.

To effectively lock the coupling device 20 to the vehicle hitch 30 the shaft 32 is inserted in the opening 34 and the nut 36 is tightened against the hitch 30. The pin 38 is inserted through the hole 40 and depressed so that the cotter pin 56 may be engaged with the pin beneath the shaft 32. The trailer arm 24 may then be attached to the hitch ball 22. The semispherical portion 58 of the attached arm blocks access to the pin 38 from above, and the pin head 50 cannot pass downwardly through the hole ,40. Hence the pin 38 cannot be removed without first removing the trailer arm 24. No additional locks are required. Yet once the arm 24 is unlocked and removed from the hitch ball 22, and the cotter pin 56 removed, the spring 52 will eject the pin from the hole 40 and release the nut 36 for disengagement from the shaft.

The coupling device 20 also serves to deter theft of the trailer when the trailer is parked or stored unattached to a towing vehicle. If a trailer is parked with the semispherical portion 58 empty, as would be the case when the arm is removed from the hitch ball, it is a simple matter for a thief to mount the trailer arm to his own vehicle with a hitch ball and hitch and drive away with the trailer. Even if the latch 60 is locked to prevent insertion of a hitch ball therein, a thief may insert some smaller diameter protrusion which will be suitable for effective towing at least for short distances. By leaving the coupling device 20 inserted within the trailer arm semispherical portion, and by locking the latch 60 once the pin 38 has been inserted, the shaft 32 is prevented from being inserted into a standard-sized hitch hole. In addition to making the effective diameter of the shaft too large for insertion, the protruding pin also prevents a nut from being threaded on the shaft and hence prevents the trailer arm from being effectively connected to the hitch of a vehicle.

Figure 3:
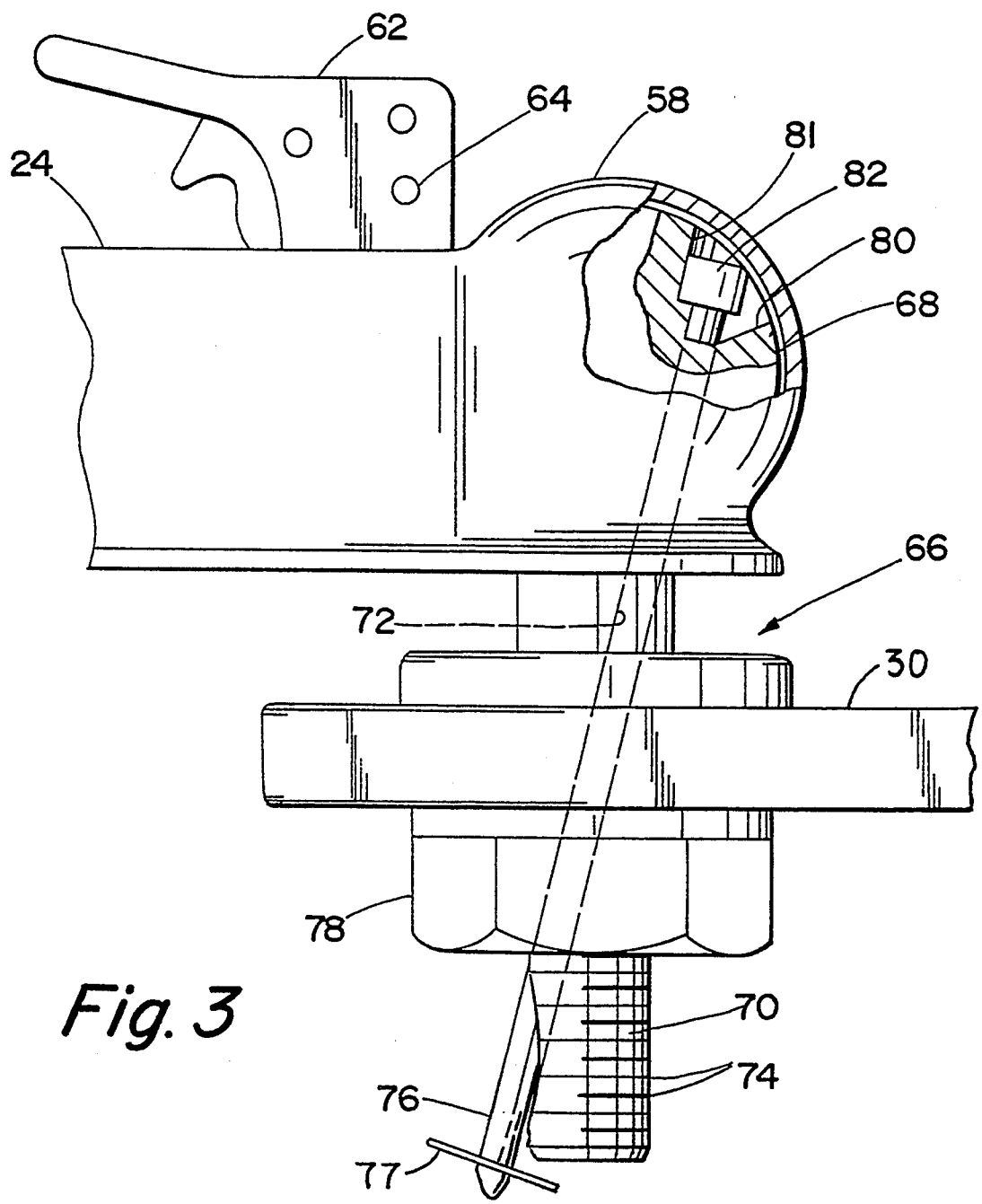
FIG. 3 is a side elevational view of an alternative embodiment coupling device, partially broken away to disclose an inclined surface for ejection of the locking pin.

An alternative embodiment coupling device 66 is shown in FIG. 3. The coupling device 66 is employed with a conventional trailer arm 24 as disclosed above. The coupling device 66 has a hitch ball 68 with a downwardly extending threaded shaft 70 with a hole 72 which extends through the hitch ball 68 and the shaft 70 at an angle so as to open outwardly in the threads 74 of the shaft. A pin 76 extends through the inclined hole 72 to block the removal of the nut 78 which is threaded to the shaft 70 and which secures the device 66 to the towing hitch 30 of the towing vehicle. A cotter pin 77 is attached to the pin 76 to hold the pin 76 in place within the ball when there is no trailer arm mounted to the hitch ball 68. No spring is mounted on the pin 76, and hence the pin is not biased upwardly from the hitch ball 68 for automatic ejection upon removal from the confines of the spherical portion 58 of the arm 24. However, the hitch ball 68 is provided with an inclined ramp 80 within the cavity 81 which receives the pin head 82. The ramp communicates with the hole 72 and extends below the head 82 of the pin 76. The ramp permits a pointed object, such as a screwdriver, to be inserted beneath the pin head 82 to pry the pin 76 from the hole 72.

Figure 4:
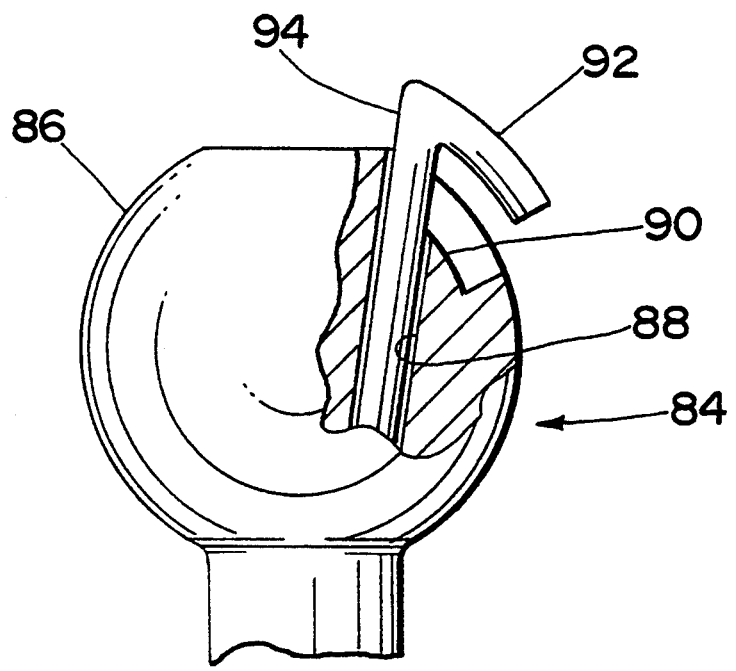
FIG. 4 is a fragmentary side elevational view of another alternative embodiment coupling device, partially broken away.

Another alternative embodiment coupling device 84 is shown in FIG. 4. The device 84 is similar to the devices disclosed above, but has a hitch ball 86 with an inclined hole 88 with a peripherally extending cavity 90. The cavity 90 is curved to receive the curved head 92 of a pin 94.

It should be noted that the coupling device of this invention may also be incorporated in hitch balls which are not integrally formed with the threaded shaft. For example, the angled pin may be inserted through aligned holes in couplers which employ twist off hitch balls or threadedly connected hitch balls.

It should be understood that the invention is not limited to the particular construction and arrangement of parts herein illustrated and described, but embraces such modified forms thereof as come within the scope of the following claims.

I claim:

1. A coupling device for connecting a trailer to an attaching member of a pulling vehicle, the device comprising:
    a) a hitch ball having an upper spherical section with a threaded shaft protruding downwardly therefrom, wherein portions of the hitch ball define a hole which extends through the spherical section and exits through the threaded shaft at a selected angle from a vertical axis defined by the shaft, and wherein the threaded shaft extends through the attaching member;
    b) a nut threaded on the threaded shaft beneath the attaching member, wherein the nut secures the hitch ball to the attaching member; and
    c) a pin which extends through the hole and protrudes from the hole beneath the nut to prevent removal of the nut from the shaft.

2. The device of claim 1 further comprising:
    a) portions of the pin which define a notch which extends beyond the threaded shaft;
    b) a fastener which engages with the notch of the pin;
    c) portions of the pin which define a head extending from the hole;
    c) a spring extending between the head and the upper spherical section, wherein the spring biases the pin upwardly, such that removal of the fastener from the pin ejects portions of the pin from the hitch ball.

3. The device of claim 1 wherein portions of the upper spherical section define a surface which is inclined toward the hole, and wherein the pin has a head which extends above the inclined surface to allow a tool to be inserted below the pin head to aid in the removal of the pin from the hole.

4. The device of claim 1, wherein portions of the pin extend from the hole to define a downwardly directed segment which engages with a recess defined by portions of the upper spherical section.

5. The device of claim 1 wherein a flange protrudes beneath the upper spherical section and engages with the attaching member of the pulling vehicle.

6. A coupling device for connecting a trailer to an attaching member of a pulling vehicle, the device comprising:
    a) a hitch ball having an upper spherical section;
    b) a threaded shaft which extends downwardly from the hitch ball and which defines a shaft axis, wherein the shaft extends through an opening in a pulling vehicle attaching member;
    c) portions of the hitch ball and the shaft which define an upwardly opening hole which extends through the spherical section and exits through the threaded shaft at a selected angle from the shaft axis;
    d) a nut threadedly engaged on the shaft beneath the attaching member, wherein the nut secures the hitch ball to the attaching member; and
    e) a pin which extends through the hole and protrudes sidewardly and downwardly from the hole beneath the nut to prevent removal of the nut from the shaft, wherein the pin has a head which is wider than the hole to prevent passage of the pin through the hole, and wherein the pin is inaccessible when the trailer arm of a trailer is connected to the hitch ball.

* * * * *